United States Patent [19]

Yasuda et al.

[11] 4,443,106

[45] Apr. 17, 1984

[54] MEASURING DEVICE FOR MEASURING THE AMOUNT OF CHANGE IN THICKNESS OF THE PAINT LAYER

[75] Inventors: Zenichi Yasuda, Nishinomiya; Misao Morita, Kobe; Takashi Nakajima, Nishinomiya, all of Japan

[73] Assignee: Nippon Paint Co., Ltd., Osaka, Japan

[21] Appl. No.: 326,675

[22] Filed: Dec. 1, 1981

[30] Foreign Application Priority Data

Aug. 22, 1981 [JP]  Japan ............................... 56-131921

[51] Int. Cl.$^3$ ............................................. G01B 9/02
[52] U.S. Cl. .................................... 356/357; 73/150 R
[58] Field of Search ..................... 356/357, 358, 381; 73/61.3, 150 R, 432 L; 250/203 CT, 549

[56] References Cited

U.S. PATENT DOCUMENTS 2,338,129  1/1944  Moore ............................... 73/150 R
3,974,678  8/1976  Rooney et al. ................. 73/150 R X

OTHER PUBLICATIONS

Puryayev et al., "An Interferometer for Monitoring Layer Thickness . . . " *Sov. J. Optical Tech.*, vol. 40, No. 3, pp. 162–164, Mar. 1973.

*Primary Examiner*—William L. Sikes
*Assistant Examiner*—Matthew W. Koren
*Attorney, Agent, or Firm*—Wenderoth, Lind & Ponack

[57] ABSTRACT

A measuring device for measuring the change in time-dependent thickness of the paint layer without any need of direct contact thereto. The device is provided with an optical arrangement which is well-known as Michelson-interferometer in principle, and is effective to obtain sharp and clear interference fringes even though the paint layer has a low reflectivity. It is also possible at laboratory side to observe the change of the paint layer under the circumstances to which the paint layer may be exposed actually.

11 Claims, 8 Drawing Figures

MEASURING DEVICE FOR MEASURING THE AMOUNT OF CHANGE IN THICKNESS OF THE PAINT LAYER

FIELD OF THE INVENTION

The present invention relates to a measuring device for measuring the amount of change in thickness of a paint layer with time.

BACKGROUND OF THE INVENTION

Change in the thickness of a paint layer with time relates to the amount of volatilization of solvents contained therein and the change in structure of each material contained. Therefore, the measurement of the change in thickness of the paint layer is useful for evaluating the properties of the paint and also for determining the best conditions for painting such as the thickness of the paint layer to be applied.

Although there have been proposed many devices for measuring the change in thickness of a paint layer, it is difficult to say that they have enough functions to get the user's approval.

For example, there has been proposed a measuring device capable of measuring the thickness of the paint layer by direct contact therewith. However, the device does not have wide use, because it is useful only when the surface of the work to be painted is flat and only after the paint layer has been hardened sufficiently. Moreover, the device has the disadvantages that it is difficult to use because the contact pressure upon the paint layer must be kept at a precise constant value and that the paint layer is destroyed at the measuring points by said direct contact therewith. In other words, a device of this type is impossible to use for the measurement of the change in thickness of a paint layer which has not yet hardened sufficiently.

Also, all measuring devices previously proposed have the common disadvantage that they cannot measure the change in thickness of a paint layer time sequentially or the behavior thereof under the same conditions of the actual air flow to which the paint layer may be exposed, because they have no means for controlling such conditions as the velocity, the temperature and the humidity of the air flow which might affect the change of the paint layer.

OBJECT OF THE INVENTION

One of the objects of the present invention is to provide a measuring device which is able to measure the change in thickness of a liquid layer not yet hardened, sequentially in an optical manner and accordingly without any need to contact the liquid layer.

To this end, the present invention utilizes an optical measuring system based on the well known Michelson interferometer.

However, it is impossible to obtain interference fringes sharp and clear enough for measurement thereof if one simply replaces the movable reflective mirror by the paint layer in such a optical measuring system, because the paint layer has low reflectivity compared with the reflective mirror employed in the Michelson interferometer.

Therefore, another object of the present invention is to provide a measuring device capable of measuring the change in thickness of a liquid layer such as a paint layer optically even when the paint has a low reflectivity.

A further object of the present invention is to provide a measuring device which has a means for changing the environment of the paint layer such as the velocity of the air flow, the temperature and the humidity thereof corresponding to the circumstances under which the paint layer might be exposed in normal use. Therefore, according to the present invention, it becomes possible to observe in the laboratory the change or the behavior of the paint which would be expected when the paint is exposed to the normal conditions.

A still further object of the present invention is to provide a measuring device capable of measuring the change in thickness of the paint layer automatically in a time-sequential manner.

SUMMARY OF THE INVENTION

A measuring device according to the present invention comprises a light source such as a laser for emitting a coherent light, a means for collimating the light emitted from the light source and removing noise components thereof, a chamber having a support means therein for the support of a test piece painted on one surface thereof with a paint layer to be tested, a control means for controlling the atmosphere in the chamber to cause the paint layer to dry under a predetermined condition, a semitransparent mirror arranged in the chamber and inclined to the optical axis of the collimating means for splitting the collimated light into first and second light beams, the first light beam being directed perpendicularly to the paint layer and second light beam perpendicularly to a reflective mirror which is supported in the chamber, a receiver for receiving the first and second light beams after having been reflected from the paint layer and reflective mirror, respectively, and then having been joined together by the semitransparent mirror, the receiver upon receipt of the first and second light beams forming thereon interference fringes resulting from the interference between the first and second light beams, and a means for measuring the amount of movement of the interference fringes.

BRIEF DESCRIPTION OF THE DRAWINGS

Other objects and features of the present invention will be apparent from the following detailed description of a preferred embodiment of the present invention referring to the accompanied drawings wherein.

DETAILED DESCRIPTION OF THE PREFERRED EMBODIMENT

Figure 1:
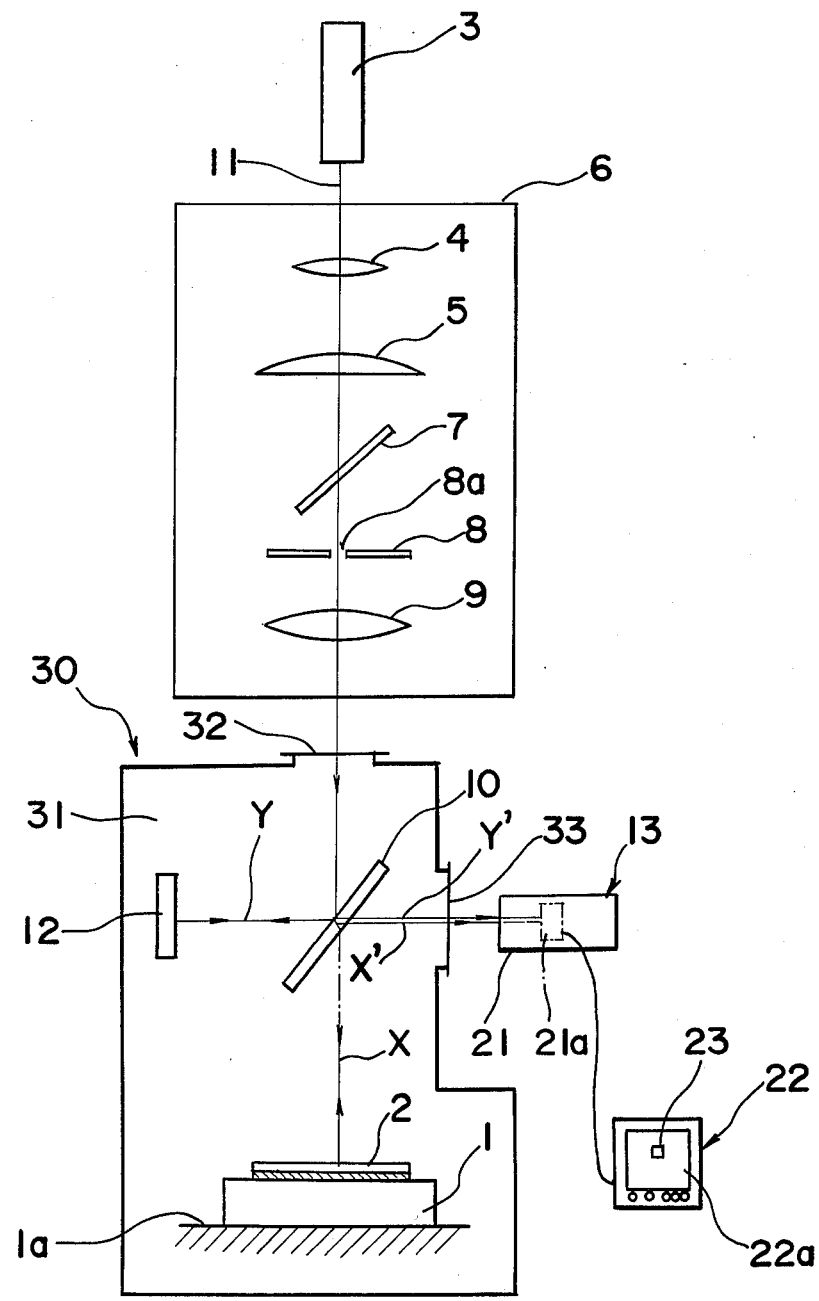
FIG. 1 is a schematic view showing an optical arrangement employed in a preferred embodiment of the present invention.

As shown in FIG. 1, an apparatus embodying the present invention comprises a casing 30 defining a chamber 31 therein, a collimator 6 being arranged above casing 30.

The collimator 6 is provided for collimating a laser beam emitted from a laser source 3 arranged thereabove and removing noise from the laser beam in the process of collimating. To this end, collimator 6 comprises a collimator lens 4 for collimating a laser beam emitted from laser source 3 into a parallel laser beam 11, first convex lens 5 for focusing parallel laser beam 11, a polarizing filter 7 for unifying the direction of the polarization of said laser beam to remove the noise contained therein, a pinhole plate 8 having a pinhole 8a at which said laser beam is focused by first convex lens 5, and a second convex lens 9 for collimating said laser beam after said laser beam has passed through pinhole 8a of pinhole plate 9 into a parallel laser beam having a diameter of 5~9 mm.

These elements are arranged along the optical axis of said collimator 6. The polarizing filter 7 arranged between first convex lens 5 and pinhole plate 8 is inclined to said optical axis for the purpose mentioned above. The pinhole plate 8 is arranged with the pinhole 8a positioned at the focal point of first convex lens 5. The second convex lens 9 is arranged apart from pinhole plate 8 by the focal distance thereof. In other words, lens 9 has a focal point on pinhole 8a so that it is able to collimate the laser beam which is focused at pinhole 8a and then diverges therefrom.

The chamber 31 has a flat table 1a at the bottom portion thereof, on which is placed a test piece 1 painted on the upper surface thereof with a paint layer 2 to be measured. In chamber 31, a semitransparent mirror 10 is arranged above table 1a and inclined at a 45° angle to the laser beam collimated by collimator 6. Said semitransparent mirror 10 splits said laser beam into a first laser beam X and a second laser beam Y, first laser beam X being directed perpendicularly to paint layer 2 of the test piece 1 and second laser beam Y being directed perpendicularly to a reflective mirror 12 which is arranged at a predetermined position in chamber 31.

There is provided at the outside of casing 30 a receiver 13 facing towards another window 33 formed on the side wall of casing 30. In this embodiment, television camera 21 is used as receiver 13. The television camera 21 receives first and second laser beam X', Y' by the camera tube 21a thereof, first laser beam X' having been reflected from paint layer 2 and then having been reflected partly from semitransparent mirror 10 and said second laser beam Y' having been reflected from reflective mirror 12 and having passed partly through semitransparent mirror 10. The first and second laser beams X' and Y' cause the interference by joining together through semitransparent mirror 10 along the path towards television camera 21, and, as a result of said interference, interference fringes are formed on the camera tube 21a. The camera tube 21a transforms the image of said interference fringes into video signals. Said video signals are transferred to a monitoring television 22 and again are reproduced into the image of said interference fringes. A photoconductive device 23 such as a phototransister is attached to a predetermined point on the surface 22a of monitoring television 22. The photoconductive device 23 transforms the intensity of light at said predetermined point into an electrical signal corresponding thereto.

Figure 2:
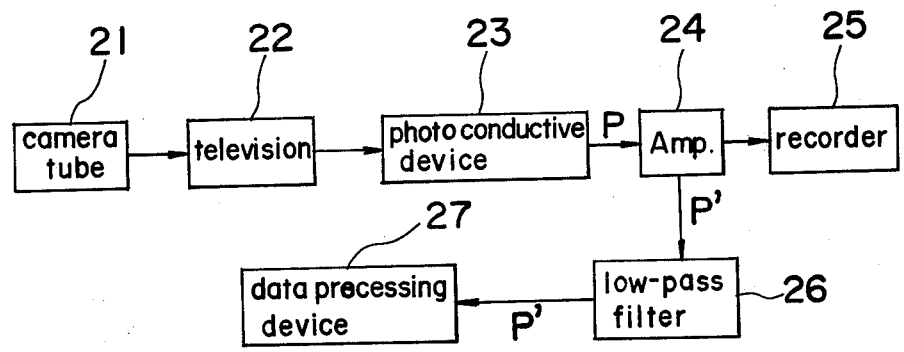
FIG. 2 is a block diagram showing a circuit for processing signals obtained by the movement of the interference fringes.
Figure 3:
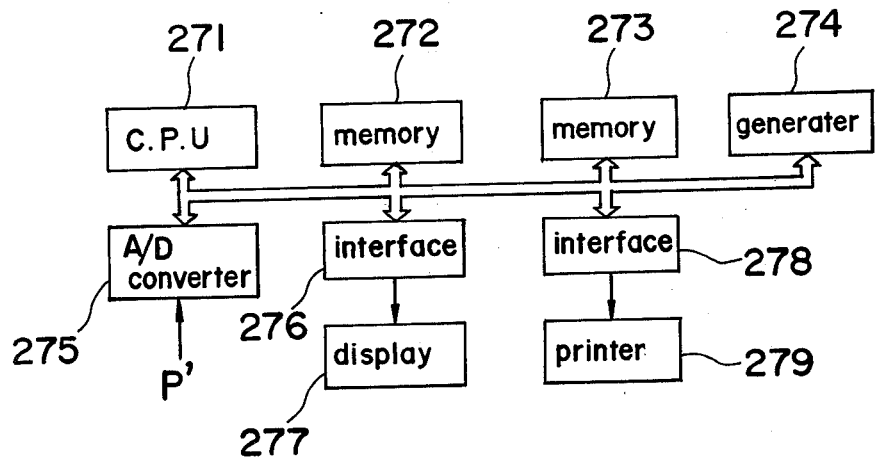
FIG. 3 is a block diagram showing the details of one block of FIG. 2.

As shown in FIG. 2, signal P from photoconductive device 23 is first applied to an amplifier 24. The amplifier 24 amplifies signal P and then applies the amplified signal P both to a recorder 25 and to a low pass filter 26. The recorder 25 records said signal on a recording paper according to a well-known method (See FIG. 4).

The low pass filter 26 removes high frequency noise contained in signal P', and thereafter applies signal P' to a data processing device 27 for processing signal P'. The data processing device 27 is constituted by a microcomputer. The microcomputer 27 indicates the change in thickness of the paint layer 2 by and after processing signal P' as described hereinafter. Specifically, signal P' is applied first in an A/D converter 275 and is thereby converted to digital signals. These digital signals are stored in a memory 273 by sampling thereof according to sampling pulses generated by a generator 274.

According to a predetermined program stored in a memory 272, a central processing unit 271 detects the peak of the signals from the sampling data stored in memory 273 and counts the number of peaks per unit time. This number of peaks per unit time is equal to the number of said interference fringes which have crossed photoconductive device 23 during said unit time, in other words, the amount of the movement of said interference fringes. The central processing unit 271 calculates the change in thickness of the paint layer from said number according to a well-known method.

The signal indicating the change in thickness of paint layer 2 is applied both to a display device 277 and to a printer 279 via interfaces 276 and 278, respectively. The display device 277 displays the change in thickness of the paint layer 2 and a printer 279 prints the data thereof digitally.

Figure 5:
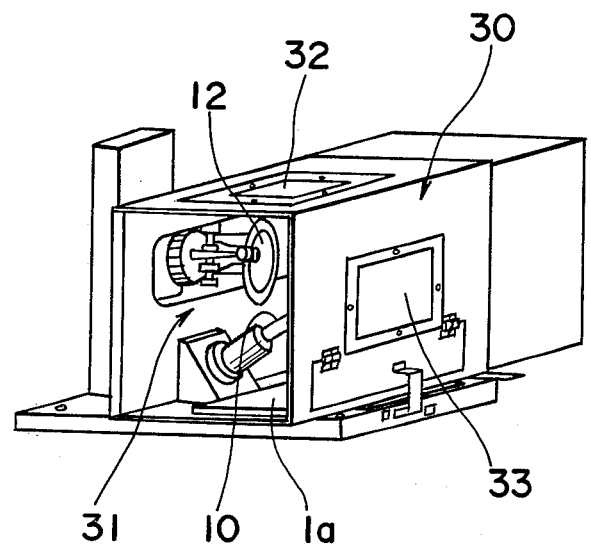
FIG. 5 is a perspective view showing a chamber according to the preferred embodiment of the present invention.

As shown in FIG. 5, casing 30 has a door member for inserting and removing test piece 1 into and out of chamber 31, and said semitransparent mirror 10 and reflective mirror 12 are supported adjustably in chamber 31.

Figure 6:
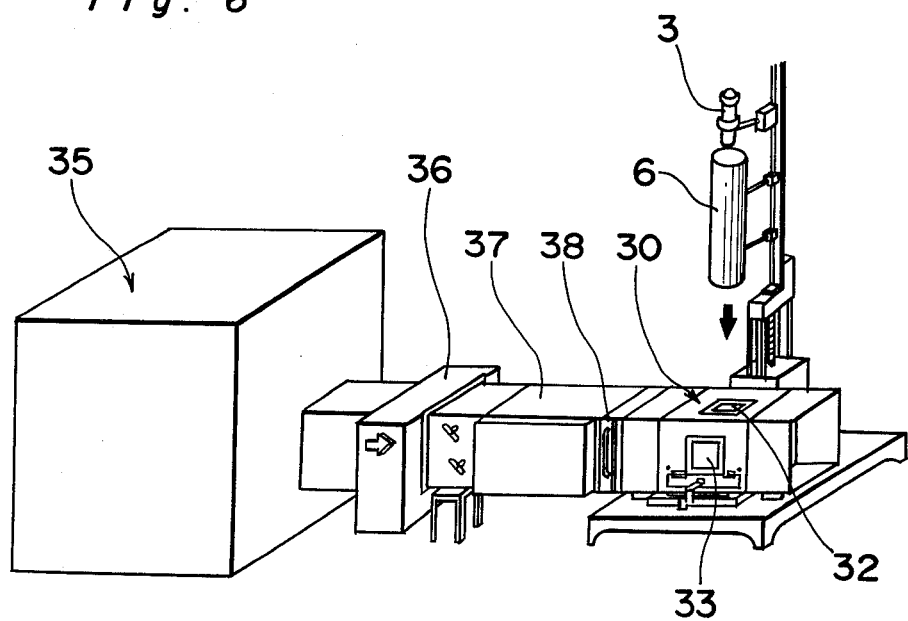
FIG. 6 is a perspective view showing the whole of a measuring device according to the preferred embodiment of the present invention.

As shown in FIG. 6, the apparatus embodying the present invention further provides a large box 35 for forming therein a chamber of constant temperature and humidity. In said chamber of constant temperature and humidity, there are provided some control means such as heater means, cooler means, regulater means for humidity etc. not shown in FIG. 6, so that the temperature and the humidity in said chamber may be controlled by them arbitrarily.

The chamber in box 35 is connected to one side of chamber 31 of casing 30 by a duct 37 having the same cross section as that of casing 30. Along duct 37, a fan 36 and an air filter 38 are provided. Fan 36 produces an air flow directed to chamber 31.

The conditions of said air flow such as the temperature, the humidity and the velocity thereof are controlled by control means and said fan 36 under consideration of the conditions to which the paint layer may be exposed in normal use. The air flows through duct 37 and air filter 38 and thereafter crosses said chamber 31 perpendicularly to the vertical plane including the optical axis of collimator 6 and, therefore, light paths of laser beams X, Y, X' and Y'. The air then flows out from the exit of casing 30.

As shown in FIG. 6, laser source 3 and said collimator 6 are desirably supported to be adjustable in their heights to the casing 30, respectively.

Figure 7:
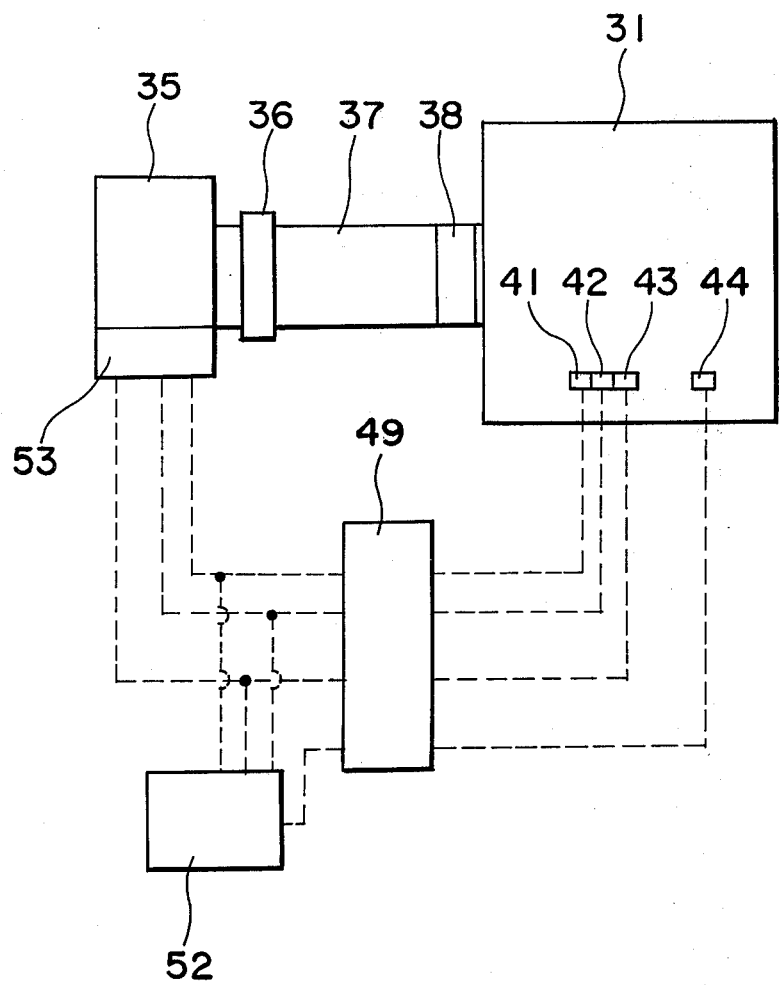
FIG. 7 is a schematic plan view showing a control means according to the preferred embodiment of the present invention.

Moreover, as shown in FIG. 7 schematically, there are provided in chamber 31 a sensor 41 for sensing the velocity of the air flow, a sensor 42 for sensing the temperature thereof, a sensor 43 for sensing the humidity thereof and also a sensor 44 for detecting the temperature of the paint layer 2.

Each signal of these sensors 41, 42 and 43 is applied both to a control circuit 53 and to a recorder 52 after having been conditioned by a signal conditioner 49.

The control circuit 53 compares these signals with the predetermined values set prior to the beginning of the measurements, and controls said control means and fan 36 according to the differences between the actual air conditions and the predetermined air conditions so as to realize the predetermined air conditions in chamber 31. The recorder 52 records the temperature, the humidity, and the velocity of said air flow in chamber 31 sequentially.

In the operation of said apparatus, one sets the air conditions of the air flow such as the temperature, etc. and controls the actual air conditions in chamber 31 to coincide with the air conditions being set. Then, one sets the test piece 1 painted with the paint layer 2 to be tested on the table 1a of chamber 31 and energize laser source 3 to emit the laser beam. The laser beam is collimated by collimator 6 after the noise contained therein has been removed and, then, the collimated laser beam is led to semitransparent mirror 10 through window 32.

The semitransparent mirror 10 splits said laser beam into first and second laser beams X and Y. The first laser beam X illuminates the surface of paint layer 2 perpendicularly thereto over an area of diameter 5~9 mm. The second laser beam Y is reflected from reflective mirror 12 perpendicularly thereto.

The first and second laser beams X and Y, having been reflected from paint layer 2 and said reflective mirror 13, respectively, are joined together by semitransparent mirror 10 so that the interference may be caused. Specifically, first laser beam X', having been reflected by semitransparent mirror 10, and second laser beam Y', having passed through semitransparent mirror 10, interfere with each other along each path thereof, and then forms the interference fringes on the surface of camera tube 21a of said television camera 21 as a result of the interference between first and second laser beams X' and Y' based upon the difference between the path lengths thereof. Although the first laser beam X' is reflected by the paint layer 2 having a low reflectivity, the interference fringes formed is clear enough to measure thereof, since the noise has been already removed by collimator 6.

Moreover, since air flow in said chamber 31 flows perpendicularly to both paths of first and second laser beams X, Y, X' and Y', said first and second laser beams are subjected to the same conditions as far as said air flow is concerned and, accordingly any difference due to said air flow is not caused between each path of said first and second laser beams. Also, since semitransparent mirror 10, reflective mirror 12 and test piece 1 are parallel to the direction of said air flow, turbulence in chamber 31 is minimized to achieve a uniform distribution of the velocity of said air flow in chamber 31. Further, since only absolutely necessary optical elements such as semitransparent mirror 10 are arranged in chamber 31 and other optical elements such as collimator 6 are outside of said chamber 31, any deformation of other optical elements is not caused by said air flow.

The above-described arrangement of elements permit clear and sharp interference fringes. The image of said interference fringes to be obtained thus formed on the surface of camera tube 21a is transformed into electrical signals by camera tube 21a and then reproduced on the cathode ray tube (CRT) 22a of monitoring television 22.

The interference fringes on the CRT 22a moves according to the decrease in thickness of paint layer 2. This movement of said interference fringes is detected by photoconductive device 23 attached on said CRT 22a.

Figure 4:
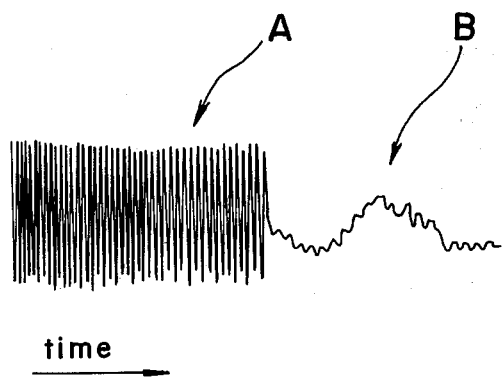
FIG. 4 is a graph showing a signal obtained from the movement of the interference fringes.

FIG. 4 shows the output of recorder 25. As shown by ranges A and B in FIG. 4, said output changes at the first stage A rapidly due to the rapid decrease in the thickness of paint layer 2 while paint layer 2 is in a liquid state, and changes slowly at the second stage B during the transition from the liquid state to the hardened state.

The recorder 25 records the changes of said output of photoconductive device 23 continuously. On the other hand, data processing device 27 counts the number of peaks of the signal per unit time, namely, the number of interference fringes which cross photoconductive device 23 during a unit time, and calculates the change in thickness of paint layer 2 therefrom.

Figure 8:
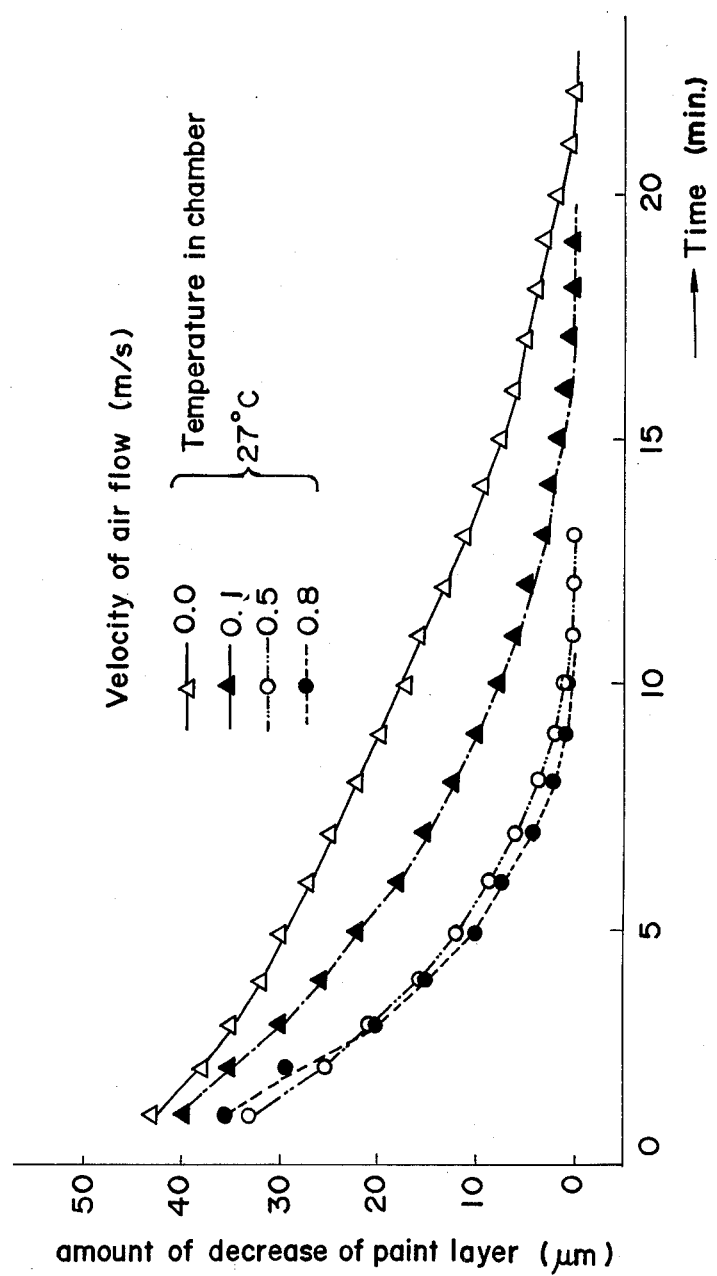
FIG. 8 is a graph showing changes in thickness of the paint layer under different conditions measured by the device according to the present invention.

FIG. 8 shows the changes in thickness of the paint layer 2 observed by using said apparatus under air conditions that the temperature in chamber 31 is maintained constant at 27° C. and the velocity of air flow in chamber 31 is changed to 0.0, 0.1, 0.5 and 0.8 (m/sec), respectively.

It should be understood that the foregoing description is directed to the preferred embodiment of the disclosed device and that various changes and modifications, for example, mixing other vaporized chemicals gas such as hydro-carbons gas into said air flow, may be made without departing from the spirit and scope of the present invention represented by the appended claims.

What is claimed is:

1. A measuring device for measuring a change in time-dependent thickness of a paint layer, comprising:
   a light source for emitting a coherent light;
   a means for collimating the light emitted from said light source along an optical axis and removing noise components thereof;
   a first chamber having a support means therein for the support of a test piece painted on one surface thereof with a paint layer to be tested;
   a control means for controlling the atmosphere in said first chamber to cause the paint layer to dry under a predetermined condition;
   a reflective mirror supported in said first chamber; a semitransparent mirror disposed in said first chamber and inclined to the optical axis of said collimating means for splitting the collimated light into first and second light beams, the first light beam being directed perpendicularly to the paint layer and the second light beam being directed perpendicularly to said reflective mirror;
   a receiver for receiving the first and second light beams after having been reflected from the paint layer and said reflective mirror, respectively, and then having been joined together by said semitransparent mirror, said receiver upon receipt of the first and second light beams forming thereon interference fringes resulting from the interference between the first and second light beams; and
   a means for measuring the amount of movement of the interference fringes;

whereby change in thickness of the paint layer with time is indicated by the amount of movement of the interference fringes measured.

2. A measuring device according to claim 1, wherein said light source is a laser source.

3. A measuring device according to claim 1 or claim 2, wherein said collimating means is comprised of a collimator lens, a first convex lens for focusing the collimated light on said collimator lens, a plate having a pinhole, said plate being disposed such that said pinhole is positioned at the focal point of said first convex lens, and a second convex lens for collimating the light beam after the light beam has passed through said pinhole.

4. A measuring device according to claim 3, wherein said collimating means further comprises a polarizing filter for unifying the direction of polarization of the light emitted from said light source.

5. A measuring device according to claim 1, wherein said control means includes a box defining a second chamber therein of constant temperature and humidity.

6. A measuring device according to claim 1 or claim 5, wherein said control means includes a means for causing an air flow in said first chamber.

7. A measuring device according to claim 6, wherein the air flow is directed perpendicularly to the plane containing the paths of the light beams.

8. A measuring device according to claim 6, wherein said control means includes at least a thermoheater, a heat exchanger for coolant, a regulator for humidity and a fan.

9. A measuring device according to claim 1, wherein said receiver is comprised of a television camera and a television for monitoring.

10. A measuring device according to claim 9, wherein said detecting means is an photoconductive device attached on the surface of the cathode ray tube of said television.

11. A measuring means according to claim 1, wherein said control means includes at least a thermoheater, a heat exchanger for coolant, a regulator for humidity and a fan.

* * * * *